United States Patent [19]

Maher

[11] Patent Number: 4,468,878
[45] Date of Patent: Sep. 4, 1984

[54] OUTRIGGER FISHING ROD HOLDER

[76] Inventor: Raymond J. Maher, 682 Cedar La., Teaneck, N.J. 07666

[21] Appl. No.: 454,604

[22] Filed: Dec. 30, 1982

[51] Int. Cl.³ ............................................. A01K 97/10
[52] U.S. Cl. .................................. 43/21.2; 248/222.1; 248/538
[58] Field of Search ...................... 43/21.2; 248/222.1, 248/223.4, 514, 538

[56] References Cited

U.S. PATENT DOCUMENTS

| | | | |
|---|---|---|---|
| 3,126,180 | 3/1964 | Mandolare | 43/21.2 |
| 3,802,652 | 4/1974 | Holton, Jr. | 43/21.2 X |
| 3,870,259 | 3/1975 | Reynolds | 43/21.2 X |
| 4,017,998 | 4/1977 | Dumler | 43/21.2 |
| 4,375,731 | 3/1983 | Budd | 43/21.2 |

FOREIGN PATENT DOCUMENTS

| | | | |
|---|---|---|---|
| 522156 | 9/1953 | Belgium | 43/21.2 |
| 537726 | 10/1955 | Belgium | 248/222.1 |

Primary Examiner—Nicholas P. Godici
Assistant Examiner—P. Weston Musselman, Jr.
Attorney, Agent, or Firm—Donald R. Heiner

[57] ABSTRACT

An outrigger fishing rod holder for mounting in or on the hull of a fishing vessel for holding a fishing rod in a fixed position until a catch is made. The device comprises a tubular member for fixedly holding the fishing rod and the tubular member in turn is pivotedly mounted in a generally U shaped holding bracket. The U shaped member in turn has a tapered mounting bracket attached to it for securing same to a mounting plate on or in the hull of the fishing vessel. The U shaped supporting bracket has a semicircular cut out portion which allows the tubular member to pivot after a catch has been made.

1 Claim, 3 Drawing Figures

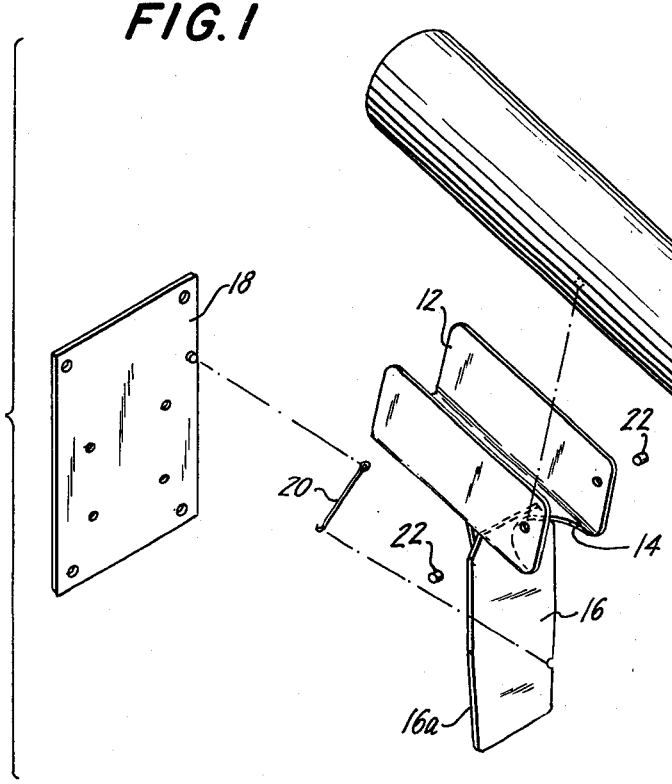
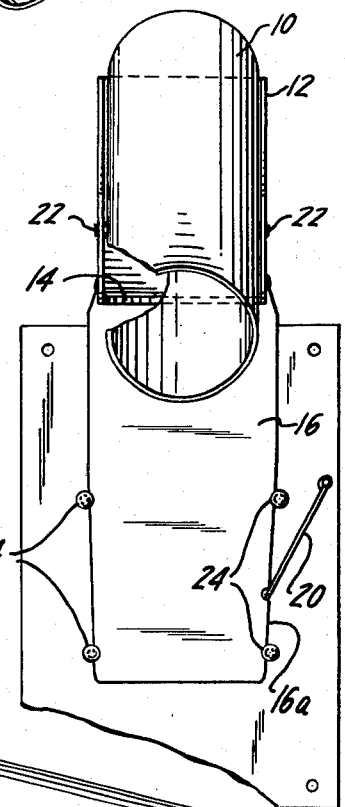
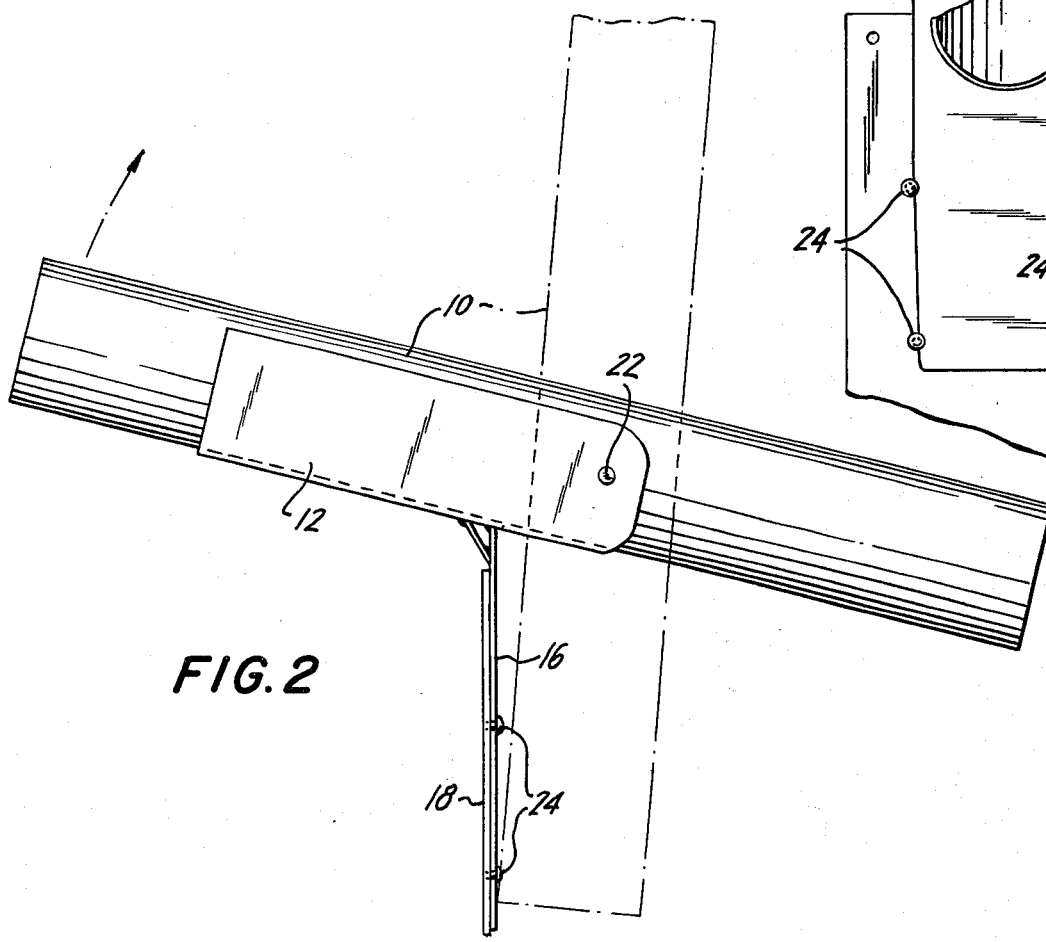

OUTRIGGER FISHING ROD HOLDER

BACKGROUND OF THE INVENTION

This invention relates generally to an outrigger fishing rod holder adapted to be mounted on the inside of a fishing vessel for holding a fishing rod stationary until such time as a strike or catch is made. After a strike or a catch is made the outrigger rod holder can be rotated inwardly of the fishing vessel, about pivot pins, thereby allowing the fisherman to remove the fishing pole from the outrigger rod holder without the necessity of leaning overboard of the vessel and thereby minimizing the chance of the fisherman either losing the fishing rod or falling overboard.

SUMMARY OF THE INVENTION

This invention relates generally to a means of fixedly supporting a fishing rod, inboard of a fishing vessel, preventing the fishing rod from rotating while in the rod holder, and allowing the fisherman to rotate the rod holder inboard of the fishing vessel after a strike or catch has been made for the purpose of easily removing the fishing rod from the holder and allowing the fisherman to complete his catch. The device is adapted to be mounted to a mounting plate which in turn is fastened by any known acceptable method inboard of the fishing vessel either on the hull itself or to the deck.

Heretofore, fishing rod outrigger rod holders have been mounted on the rail or outboard of the fishing vessel in a fixed manner such that when a strike or catch is made the fisherman must lean overboard several feet in order to remove the rod from the holder. This has proved cumbersome and often will lead to the loss of the fishing rod and perhaps even exposing the fisherman to the possibility of falling overboard.

Since the instant invention is mounted inboard of the vessel and can be pivoted inwardly after a catch or strike is made it is easier to remove the rod from the holder, prevents the loss of the rod, and totally alleviates the possibility of a fisherman falling overboard.

The instant invention comprises essentially a length of cylindrical tubing pivotedly mounted in a generally U shaped holding bracket wherein the U shaped holding bracket in turn has a semicircular cut out portion at one end of a size large enough to accommodate the diameter of the length of tubing such that when the tubing is pivoted about pivot pins it will allow the tubular member to rotate upward and inward of the vessel in which or to which it is attached. The U shaped holding bracket has a tapered mounting bracket attached to it, and extending downwardly from it, near the semicircular cut out portion. This tapered mounting bracket is in turn attached to a mounting plate by means of a plurality of rivet head type fastening devices which are spaced to receive the tapered portion of the mounting bracket. Further, a spring is attached at one end to the mounting plate and at its other end is disposed in a notched out portion of the tapered mounting bracket to hold same in place. The mounting plate in turn is secured inboard of the vessel by any well-known manner such as bolts, screws, or even welding.

The principal object of this invention is to provide an outrigger fishing rod holder for mounting in or on the hull of a fishing vessel for holding a fishing rod in a fixed position until a strike or catch is made.

Another object of the invention is to provide an outrigger fishing rod holder for mounting in or on the hull of a fishing vessel wherein the fishing rod holder can be rotated inboard of the vessel, about pivot pins, after a strike or catch is made.

Another object of the invention is to provide an outrigger fishing rod holder of the kind indicated having a pin extending through the rod holder at the inboard end thereof which will coact with a groove in the end of a fishing rod to prevent rotation of the fishing rod while in the fishing rod holder.

Another object of the invention is to provide an outrigger fishing rod holder of the kind indicated that is simple and compact in design, that is sturdy and durable in construction, that is reasonable in manufacturing and installation costs, that does not require servicing or maintenance, and that is capable of rendering efficient and dependable service over extended time periods.

Another object of the invention is to provide an outrigger fishing rod holder of the kind indicated that will allow a fisherman easy access, without leaning overboard, to a fishing rod, after a strike or catch has been made.

Another object of the invention is to provide an outrigger fishing rod holder of the kind indicated that will decrease substantially or fully prevent a fisherman from losing his fishing rod or falling overboard after a strike or catch is made and when he is attempting to remove the rod from the holder.

With these and other objects, the nature of which will become apparent, the invention will be more fully understood by reference to the drawings, and the accompanying detail description and claims.

IN THE DRAWINGS

FIG. 1 is an exploded view of the invention showing substantially all of the parts of the outrigger fishing rod holder in an unassembled condition.

FIG. 2 is a side view of the outrigger fishing rod holder shown in FIG. 1 but in an assembled condition and showing the rod holder in its pivoted inwardly position in dotted lines.

FIG. 3 is an end view of the device in its assembled condition looking towards the inboard end.

DESCRIPTION OF THE PREFERRED EMBODIMENT

Referring now to FIG. 1 there is shown in an exploded and unassembled view the basic elements of this outrigger fishing rod holder comprising a length of cylindrical tubing 10 having a pin 11 extending there through near one end thereof which engages a slot formed in the end of a fishing rod handle such that when the fishing rod is inserted into the opposite end of cylindrical tubing 10 it will be secured against rotation by means of the pin 11 engaging said slot.

Cylindrical tubing 10 is pivotedly mounted in an elongated U shaped bracket 12 having a semicircular cut out portion 14 formed in the base of said U shaped bracket 12 and wherein said semicircular cut out portion 14 is large enough to accommodate the diameter of cylindrical tubing 10. The cylindrical tubing 10 can then rotate upwardly and inwardly about pivot pins 22 which are inserted through the openings formed through the vertical portions of U shaped bracket 12 and through mating holes formed through cylindrical tubing 10.

Extending vertically downward from the base portion of said U shaped holding bracket near the semicircular cut out portion 14, is a generally rectangular mounting bracket 16 having a tapered portion 16a extending downwardly thereof for mounting on mounting plate 18 as will be more fully described below.

Mounting plate 18 is of generally rectangular or square shape and has a plurality of openings formed there through for the purpose of attaching said mounting plate to the inboard side of a fishing vessel. Further, mounting plate 18 has a second plurality of openings formed there through for the purpose of receiving fastening devices such as rivet head pins 24 for the purpose of slideably receiving the tapered portion 16a of mounting bracket 16.

It should be noted in FIG. 3 of the drawings that the openings formed through mounting plate 18 for the purpose of receiving rivet head pins 24 are spaced such that they match the taper 16a of mounting bracket 16. Thus, mounting bracket 16 is slid downwardly between mounting plate 18 and rivet head pins 24 whereby it is fixedly held in place.

A spring 20 has one end thereof attached to mounting plate 18 and its other end engages a notch formed in tapered portion 16a of mounting bracket 16 to further secure in place mounting bracket 16 and therefore U shaped holding bracket 12.

FIG. 2, in solid line, shows the invention in its assembled form with the right hand end of cylindrical tubing 10 inboard of the fishing vessel and the left hand end outboard of the fishing vessel. In phantom line cylindrical tubing 10 is shown rotated upwardly and inwardly about pivot pin 22 in which position a fishing rod can be inserted or taken out of said cylindrical tubing 10.

FIG. 3 is an end view of the invention in its assembled form and viewing same from the inboard end. In this view mounting bracket 16 is shown with tapered portion 16a extending downwardly between mounting plate 18 and rivet head pins 24 whereby mounting bracket 16 and therefore U shaped holding bracket 12 are held firmly in place. This view shown in FIG. 3 also more clearly depicts spring 20 attached at one end to mounting plate 18 and at its other end slideably engaging the notch formed in tapered portion 16a of mounting bracket 16.

In operation, mounting plate 18 is attached to the inboard side of a fishing vessel and the U shaped bracket 12 is secured to the mounting plate 18 by means of the mounting bracket 16 that is indicated above. The spring 20 is then put in place to fixedly secure the mounting bracket. When the fisherman desires to insert a fishing rod into cylindrical tubing 10 he rotates that tubing about pivot pins 22 until it is fully inboard as shown in phantom line in FIG. 2.

The fishing rod is then easily inserted and the notch formed in the end of the fishing rod coacts with pin 11 to prevent the fishing rod from rotating.

Thereafter, cylindrical tubing 10 is pivoted about pivot pins 22 to the position shown by the solid lines in FIG. 2.

After a strike or catch is made cylindrical tubing 10 is again rotated about pivot pins 22 until it is again fully inboard of the vessel as shown in phantom line in FIG. 2.

The fishing rod can then be easily withdrawn from the tubing.

It is to be noted that mounting bracket 16 is very easily and readily attached to mounting plate 18 due to the tapered portion 16a being slideably inserted between the mounting bracket and the rivet head pins.

Having described and illustrated the invention in connection with the specific embodiment, other modifications will become apparent to those skilled in the art without departing from the scope of the invention which is defined in the appended claims.

What is claimed is:

1. An outrigger fishing rod holder for mounting in or on the hull of a fishing vessel for holding a fishing rod in a fixed position until a catch is made comprising a length of cylindrical tubing for slideably receiving a fishing rod wherein said length of cylindrical tubing has a pin extending therethrough near one end thereof which engages a slot formed in the end of a fishing rod handle such that when the fishing rod is inserted into the opposite end of said length of cylindrical tubing said rod will be secured against rotation; an elongated U shaped holding bracket pivotably supporting said length of cylindrical tubing adjacent its rearward end wherein said U shaped holding bracket has a semicircular cut out portion formed in the rearward end of the base of said U shaped holding bracket and wherein said semicircular cut out portion is large enough to accommodate the diameter of said length of cylindrical tubing; a mounting bracket extending downwardly from said base of said U shaped holding bracket adjacent said rearward end, wherein said mounting bracket has a tapered portion extending downwardly thereof for attachment to a mounting plate by means of a plurality of rivet head type fastening devices which are spaced to receive the said tapered portion of said mounting bracket and which extend through openings formed through said mounting plate for the purpose of slidably receiving said tapered portion of said mounting bracket wherein a spring has an end thereof attached to said mounting plate and another end engaging a notch formed in said tapered portion of said mounting bracket to further secure in place said mounting bracket and therefore said U shaped holding bracket, and wherein said mounting plate is attached in or on the hull of a fishing vessel whereby said length of cylindrical tubing can be rotated upwardly and inwardly of said fishing vessel about pivot pins which are inserted through openings formed through the vertical portions of said U shaped holding bracket and through mating holes formed through said length of cylindrical tubing.

* * * * *